United States Patent [19]

Reiffenrath et al.

[11] Patent Number: 4,871,469
[45] Date of Patent: Oct. 3, 1989

[54] NEMATIC LIQUID-CRYSTALLINE PHASES

[75] Inventors: Volker Reiffenrath, Darmstadt; Joachim Krause, Dieburg; Thomas Geelhaar, Mainz; Rudolf Eidenschink, Münster; Hans-Adolf Kurmeier, Seeheim-Jurgenheim; Eike Poetsch, Mühltal, all of Fed. Rep. of Germany; Bernhard Scheuble, Yokohama, Japan; Georg Weber, Erzhausen, Fed. Rep. of Germany

[73] Assignee: Bescrankter Haftung, Darmstadt, Fed. Rep. of Germany

[21] Appl. No.: 154,254

[22] PCT Filed: Apr. 22, 1987

[86] PCT No.: PCT/EP87/00218

§ 371 Date: Jan. 4, 1988

§ 102(e) Date: Jan. 4, 1988

[87] PCT Pub. No.: WO87/06602

PCT Pub. Date: Nov. 5, 1987

[30] Foreign Application Priority Data

May 2, 1986 [DE] Fed. Rep. of Germany ....... 3614778

[51] Int. Cl.$^4$ .................. G02F 1/13; C09K 19/34; C09K 19/30; C09K 19/20
[52] U.S. Cl. .................. 252/299.61; 252/299.01; 252/299.5; 252/299.6; 252/299.62; 252/299.63; 252/299.64; 252/299.65; 252/299.66; 252/299.67; 350/350 R; 350/350 S; 549/369; 570/129
[58] Field of Search .......... 252/299.01, 299.6, 299.5, 252/299.66, 299.63, 299.64, 299.61, 299.65, 299.62, 299.67; 350/250 R, 350 S; 570/129; 549/369

[56] References Cited

U.S. PATENT DOCUMENTS

| | | | |
|---|---|---|---|
| 4,311,610 | 1/1982 | Zaschke et al. | 252/299.61 |
| 4,330,426 | 5/1982 | Eidenschink et al. | 252/299.63 |
| 4,398,803 | 8/1983 | Pohl et al. | 252/299.01 |
| 4,505,837 | 3/1985 | Romer et al. | 252/299.63 |
| 4,617,140 | 10/1986 | Eidenschink et al. | 252/299.63 |
| 4,684,476 | 8/1987 | Kitano et al. | 252/299.61 |
| 4,694,098 | 9/1987 | Hirai et al. | 252/299.63 |

FOREIGN PATENT DOCUMENTS

| | | | |
|---|---|---|---|
| 87679 | 9/1983 | European Pat. Off. | 252/299.61 |
| 225195 | 6/1987 | European Pat. Off. | 252/299.61 |
| 3515374 | 11/1986 | Fed. Rep. of Germany | 252/299.61 |
| 58-177939 | 10/1983 | Japan | 252/299.63 |
| 59-78148 | 5/1984 | Japan | 252/299.63 |
| 8600067 | 1/1986 | PCT Int'l Appl. | 252/299.61 |
| 8701717 | 3/1987 | PCT Int'l Appl. | 252/299.63 |

OTHER PUBLICATIONS

C.A. 107: 124957q (1987).
C.A. 109: 15600p (1987).
Lebarny, P., et al., Mol. Cryst. Liq. Cryst., vol. 127, pp. 413–429 (1985).
Demus, D., et al, Flussige Kristacle in Tabellen II, Veb Detusch Verlag fur Grundstoffindustrie, Leipzig, p. 352 (1984).
J. C. Liang et al., "Synthesis and Liquid Crystal Behavior of p-Benzotrifluoride Compounds I", *Mol. Cryst. Liq. Cryst.*, vol. 142 (1987), pp. 77–84.

*Primary Examiner*—Teddy S. Gron
*Attorney, Agent, or Firm*—Millen, White & Zelano

[57] ABSTRACT

The invention relates to the use of trifluorotoluene derivatives of the formula I

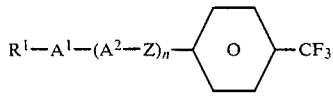

in which
$R^1$ is alkyl having 1 to 12 carbon atoms in which, in addition, one or more non-neighboring $CH_2$ groups may be replaced by —O—, —CO—, —O—CO—, —CO—O—, —O—CO—O—, —CH-halogen, —CH—CN-and/or —CH=CH—,
$A^1$ and $A^2$, in each case independently of one another, are 1,4-phenylene in which, in addition, one or more CH groups may be replaced by N, trans-1,4-cyclohexylene in which, in addition, one or two non-neighboring $CH_2$ groups may be replaced by —O—and/or —S—, or 1,4-bicyclo(2,2,2)octylene, each of which is unsubstituted or monosubstituted or poly-substituted by halogen, nitrile and/or $CH_3$,
$Z^1$ and $Z^2$, in each case independently of one another, are —CO—O—, —O—CO—, —$CH_2$O—, —O$CH_2$—, —$CH_2CH_2$— or a single bond, and
n is 0 or 1, as components of chiral tilted smectic phases.

4 Claims, No Drawings

NEMATIC LIQUID-CRYSTALLINE PHASES

The invention relates to the use of trifluorotoluene derivatives of the formula I

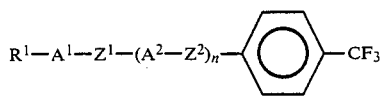

in which

R$^1$ is alkyl having 1 to 12 carbon atoms in which, in addition, one or more non-neighboring CH$_2$ groups may be replaced by —O—, —CO—, —O—CO—, —CO—O—, —O—CO—O—, —CH—halogen, —CH—CN— and/or —CH=CH—, A$^1$ and A$^2$, in each case independently of one another, are 1,4-phenylene in which, in addition, one or more CH groups may be replaced by N, trans-1,4-cyclohexylene in which, in addition, one or more non-neighboring CH$_2$ groups may be replaced by —O— and/or —S—, or 1,4-bicyclo(2.2.2)octylene, each of which is unsubstituted or monosubstituted or polysubstituted by halogen, nitrile and/or CH$_3$, Z$^1$ and Z$^2$, in each case independently of one another, are —CO—O—, —O—CO—, —CH$_2$O—, —OCH$_2$—, —CH$_2$CH$_2$— or a single bond, and n is 0 or 1, as components of chiral tilted smectic phases, and also to smectic liquid-crystalline phases, in particular chiral tilted smectic phases, containing compounds of the formula I. The invention furthermore relates to novel pyrimidine and pyridine compounds, novel cyclohexane derivatives and novel dioxane derivatives of the formula I.

Chiral tilted smectic liquid-crystallie phases having ferroelectric properties can be produced by adding a suitable chrial dope to base mixture having one or more tilted smectic phases (L. A. Beresnev et al., Mol. Cryst. Liq. Cryst. 89, 327 (1982); H. R. Brand et al., J. Physique 44, (lett.), L-771 (1983). Such phases can be used as dielectrics for rapidly switching displays which are based on the principle described by Clark and Lagerwall, of SSFLC technology (N. A. Clark and S. T. Lagerwall, Appl. Phys. Lett. 36, 899 (1980); U.S. Pat. No. 4,367,924) on the basis of the ferroelectric properties of the chiral tilted phase. In this phase, the extended molecules are arranged in layers, the molecules having a tilt angle to the layer perpendiculars. On proceeding from layer to layer, the tilt angle changes through a small angle with respect to an axis which is perpendicular to the layers, so that a helical structure is formed. In displays which are based on the principle of SSFLC technology, the smectic layers are arranged perpendicular to the plates of the cells. The helical arrangement of the tilt directions of the molecules is suppressed by a very small separation of the plates (about 1–2 μm). The longitudinal axes of the molecule are thereby forced to arrange themselves in a plane parallel to the plates of the cell, whereby two distinct tilt orientations are produced. By applying a suitable alternating electrical field, it is possible to switch to and fro between these two states in the liquid-crystalline phase having spontaneous polarization. This switching process is significantly faster than in conventional twisted cells (TN-LCDs), which are based on nematic liquid crystals.

A major disadvantage for many applications of the materials currently available having chiral tilted smectic phases (such as, for example, Sc*) is that the S$_A$ phase, above the Sc* phase, which is necessary for good orientation capability in the display, often does not arise or not in the desired temperature range.

It has now been found that the use of compounds of the formula I as components of chiral tilted smectic mixtures can substantially lessen the disadvantages mentioned. The compounds of the formula I are thus highly suitable as components of chiral tilted smectic liquid-crystalline phases. In particular, chiral tilted smectic liquid-crystalline phases which have favorable ferroelectric phase regions, in particular broad Sc* phase regions, and are particularly stable chemically, and S$_A$ phases, above the Sc phase, which are favorable for the orientation in the display, have a favorable pitch height and have values for spontaneous polarization which are high for such phases, can be produced with their aid. P is the spontaneous polarization in nC/cm$^2$.

The invention thus relates to the use of the compounds of the formula I as components of (chiral tilted) smectic liquid-crystalline phases. The invention furthermore relates to smectic liquid-crystalline phases, in particular chiral tilted smectic phases, which contain at least one compound of the formula I, and to liquid-crystal display elements, in particular electrooptical display elements, which contain such phases. The invention furthermore relates to novel pyrimidine and pyridine compounds of the formula I in which one of the A$^1$ and A$^2$ groups is pyrimidine- or pyridine-2,5-diyl, and to the cyclohexane derivatives of the forula II and the dioxane derivatives of the formula III.

The compounds of the formula I can have straight-chain or branched wing groups R$^1$. Compounds having branched wing groups can be employed in the form of the racemate or as optically active compounds. Achiral base mixtures of compounds of the formula I and, if appropriate, further achiral components can be doped with chiral compounds of the formula 1 or alternatively with other chiral compounds, in order to obtain chiral tilted smectic phases.

The compounds of the formula I include, in particular, compounds of the subformulae Ia to Id:

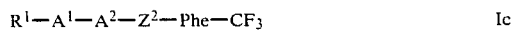

Of these, those of the subformula Ib are particularly preferred (Phe is 1,4-phenylene).

In the compounds of the formulae above and below, R$^1$ is preferably R—, R—O—, R—O—CO—, R—O—COO— or R—CO—O—. R is preferably a straight-chain alkyl group preferably having 5 to 12 carbon atoms, in which, in addition, one or two nonterminal CH$_2$ groups can be replaced by —O—, —O—CO—, —CHCH$_3$—, —CHCN—, —CH—halogen, —CHCH$_3$—O— and/or —CH=CH—. R is preferably, for example, pentyl, hexyl, heptyl, octyl, nonyl, decyl, undecyl or dodecyl, furthermore methyl, ethyl, propyl, butyl, 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6- 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl, 1,3-, 1,4-, 1,5-, 1,6- 2,4-, 2,5-, 2,6-, 3,5-, 3,6- or 4,6-dioxaheptyl, 1,4-dioxaoctyl, 1,4,7-trioxaoctyl, 1,4-dioxanonyl or 1,4-dioxadecyl.

Compounds of the formula I and of the subformulae above and below, having a branched wing group $R^1$ can occasionally be important due to better solubility in conventional liquid-crystalline base materials, but in particular, when they are optically active, as chiral dopes for chiral tilted smectic phases. However, such compounds are also suitable as components of nematic liquid-crystalline phases, in particular for prevention of reverse twist. Branched groups of this type generally contain one or two chain branches. In a preferred fashion, the asymmetrical carbon atom is linked to two differently substituted carbon atoms, one H atom and one substituent, selected from the group comprising halogen (in particular F, Cl or Br), alkyl or alkoxy in each case having 1 to 5 carbon atoms, and CN. The optically active organic radical $R^1$ or $R^2$ preferably has the formula

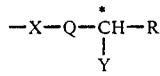

in which
X is —CO—O—, —O—CO—, —O—CO—O—, —CO—, —O—, —S—, —CH=CH—, —CH=CH—COO— or a single bond,
Q is alkylene having 1 to 5 carbon atoms, in which, in addition, one $CH_2$ group which is not linked to X may be replaced by —O—, —CO—, —O—CO—, —CO—O— or —CH=CH—, or a single bond,
Y is CN, halogen, methyl or methoxy, and
R is an alkyl group having 1 to 18 carbon atoms which is different to Y and in which, in addition, one or two non-neighboring $CH_2$ groups may be replaced by —O—, —CO—, —O—CO—, —CO—O— and/or —CH=CH—.

X is preferably —O—, —CO—O—, —O—CO—, —CH=CH—COO— (trans) or a single bond. —O—, —CO—O— and —O—CO— are particularly preferred.
Q is preferably —$CH_2$—, —$CH_2CH_2$— or a single bond, particularly preferably a single bond.
Y is preferably $CH_3$, —CN or Cl, particularly preferably —CN.
R is preferably straight-chain alkyl having 1 to 10, in particular having 1 to 7 carbon atoms in which, if appropriate, a $CH_2$ group may be replaced by —O—, —O—CO— or —CO—O—.

Preferred branched radicals are isopropyl, 2-butyl (=1-methylpropyl), isobutyl (=2-methylpropyl, isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, 3,7-dimethyloctyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl, 2-octyloxy, 3,7-dimethyloctyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl and 2-methyl-3-oxahexyl.

In the case where n=1, one of the $Z^1$ and $Z_2$ groups is preferably a single bond. $A^1$ and $A^2$ are preferably 1,4-phenylene, trans-1,4-cyclohexylene or pyrimidine-2,5-diyl. The compounds of the formula I preferably contain no more than one 1,4-phenylene group in which one or more CH groups are replaced by N.

Of the compounds of the formula I and of the subformulae above and below, those are preferred in which at least one of the radicals contained therein has one of the preferred meanings given.

The compounds of the formula I are prepared by methods which are known per se, as described in the literature (for example in the standard works such as HoubenWeyl, Methoden der Organischen Chemie [Methods of Organic Chemistry], Georg-Thieme-Verlag, Stuttgart), to be precise under reaction conditions which are known and suitable for the reactions mentioned. In this case, use can also be made of variants which are known per se but are not described in greater detail here.

If desired, the starting materials can also be formed in situ by not isolating them from the reaction mixture, but instead immediately reacting them further to form the compounds of the formula I.

Some of the compounds of the formula I are known (for example German Offenlegungsschrift 2,937,911 and DD 144,409) and some are novel. Particularly preferred are the novel compounds of the formula I in which one of the $A^1$ and $A^2$ groups is pyrimidine-2,5-diyl or pyridine-2,5-diyl, and, in the case where n=1 and $A^1$=pyrimidine-2,5-diyl, $Z^2$ is $CH_2O$—, —$OCH_2$—, —$CH_2CH_2$— or a single bond. Particularly preferred are the novel compounds of the subformulae Ib and Ic:

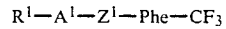  Ib

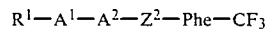  Ic in which
$A^1$ is pyrimidine-2,5-diyl or pyridine-2,5-diyl
$A^2$ is 1,4-phenylene,
Phe is 1,4-phenylene,
$Z^1$ and $Z^2$ are in each case —$CH_2O$—, —$OCH_2$—, —$CH_2CH_2$— or a single bond, and
$R^1$ has the meaning given in the case of formula I.

In these preferred pyridine and pyrimidine compounds, one of the $Z^1$ and $Z^2$ groups is preferably —$CH_2O$—, —$OCH_2$— or —$CH_2CH_2$—, and the other group is a single bond. Likewise preferred are pyridine and pyrimidine compounds in which $Z^1$ and $Z^2$ are single bonds. $R^1$ is preferably straight-chain alkyl having 2 to 12 carbon atoms, in particular having 3 to 10 carbon atoms.

Furthermore preferred are the novel cyclohexane derivatives of the formula II

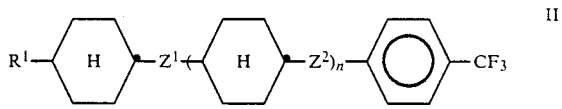  II in which
$R^1$ is alkyl having 1 to 12 carbon atoms in which, in addition, one or more non-neighboring $CH_2$ groups may be replaced by —O—, —CO—, —O—CO—, —CO—O—, —O—CO—O—, —CH—halogen, —CH—CN— and/or —CH=CH—,
$Z^1$ and $Z^2$, in each case independently of one another, are —CO—O—, —O—CO—, —$CH_2O$—, —OCH₂— or —CH₂CH₂, and one of the Z¹ and Z² groups is alternatively a single bond,
n is 0 or 1
with the proviso that, in the case where n=1 and Z¹= a single bond, Z² is —CO—O—, —CH₂O—, —OCH₂— or —CH₂CH₂.

R¹ here is preferably straight-cain alkyl having 2 to 7 carbon atoms. In the case where n=O, Z¹ is preferably —COO—, —CH₂CH₂— or a single bond. In the case where n=1, one of the Z¹ and Z² groups is preferably a single bond and the other Z¹ or Z² group is —CH₂CH₂— or —COO—, preferably —CH₂CH₂—. Particularly preferred compounds are those of the subformulae IIa to IIg:

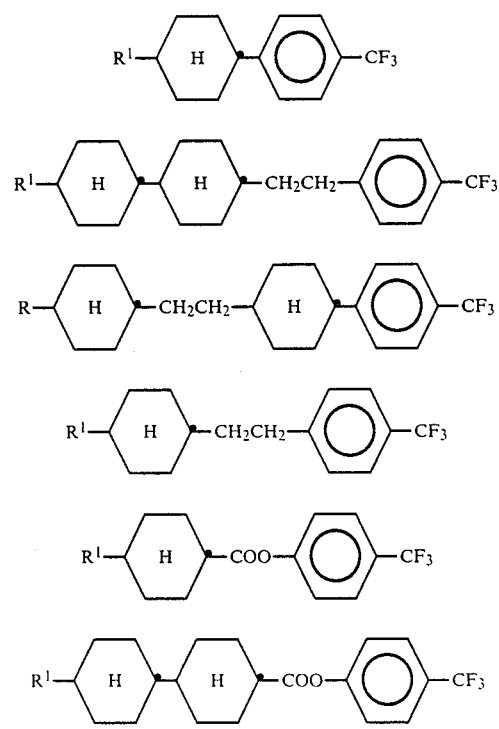

IIa
IIb
IIc
IId
IIe
IIf

Furthermore preferred are the novel dioxane derivatives of the formula III

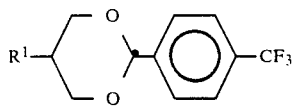

III in which
R¹ is alkyl having 1 to 12 carbon atoms in which, in addition, one or more non-neighboring CH₂ groups may be replaced by —O—, —CO—, —O—CO—, —CO—O—, —O—CO—O—, —CH—halogn, —CH—CN— and/or —CH=CH—.

R¹ here is preferably straight-chain alkyl having 2 to 7 carbon atoms.

The compounds of the formulae II and III are suitable not only as dopes for ferroelectric liquid-crystalline phases, but also, in particular, are excellent components of nematic liquid-crystalline phases.

The nematic liquid-crystalline phases according to the invention are likewise subject-matter of the invention and comprise 2 to 15, preferably 3 to 12, components, including at least one compound of the formula II and/or III. The other components are preferably selected from nematic or nematogenic substances, in particular known substances from the classes comprising the azoxybenzenes, benzylideneanilines, biphenyls, terphenyls, phenyl- or cyclohexylbenzoates, phenyl or cyclohexyl cyclohexanecarboxylates, phenylcyclohexanes, phenylbicyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexylpyrimidines, phenyl- or cyclohexyldioxanes, phenyl- or cyclohexyl-1,3-dithianes, 1-phenyl-2-cyclohexylethanes, optionally halogenated stilbenes, benzyl phenyl ether, tolanes and substituted cinnamic acids.

The most important compounds which are suitable as components of such liquid-crystalline phases can be characterized by the formula II'

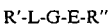 R'-L-G-E-R''  II' in which L and E are each a carbocyclic or heterocyclic ring system from the group formed from 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6disubstituted naphthalene, di- and tetrahydronaphthalene, quinazoline and tetrahydroquinazoline, G is

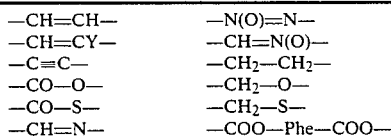

| —CH=CH— | —N(O)=N— |
| —CH=CY— | —CH=N(O)— |
| —C≡C— | —CH₂—CH₂— |
| —CO—O— | —CH₂—O— |
| —CO—S— | —CH₂—S— |
| —CH=N— | —COO—Phe—COO— | or a C—C single bond, Y is halogen, preferably chlorine, or CN, and R' and R'' are alkyl, alkenyl, alkoxy, oxaalkyl, alkanoyloxy or alkoxycarbonyloxy having up to 18, preferably up to 8, carbon atoms, or one of these radicals is alternatively CN, NC, NCS, NO₂, CH₃, F, Cl or Br.

In most of these compounds, R' and R'' are different to one another, one of these radicals usually being an alkyl or alkoxy group. However, other variants of the proposed substituents are also customary. Many such substances, or alternatively mixtures thereof, are commercially available. All these substances can be prepared by methods which are known from the literature.

The phases according to the invention contain about 0.1 to 99, preferably 10 to 95, % of one or more compounds of the formula II and/or III.

These nematic phases are distinguished by favorable phase regions, low viscosity, low optical anisotropy and favorable threshold voltages.

The chiral tilted smectic phases according to the invention preferably contain at least two, in particular at least three, compounds. Particular preference is given to chiral tilted smectic liquid-crystalline phases, according to the invention, whose achiral base mixture contains at least one other component having negative or numerically small positive dielectric anisotropy in addition to at least one compound of the formula I. This/these further component(s) of the chiral base mixture can comprise 1 to 50%, preferably 10 to 25%, of the base mixture. Suitable further components having numerically small positive or negative dielectric anisotropy are compounds of the subformulae Va to Vp:

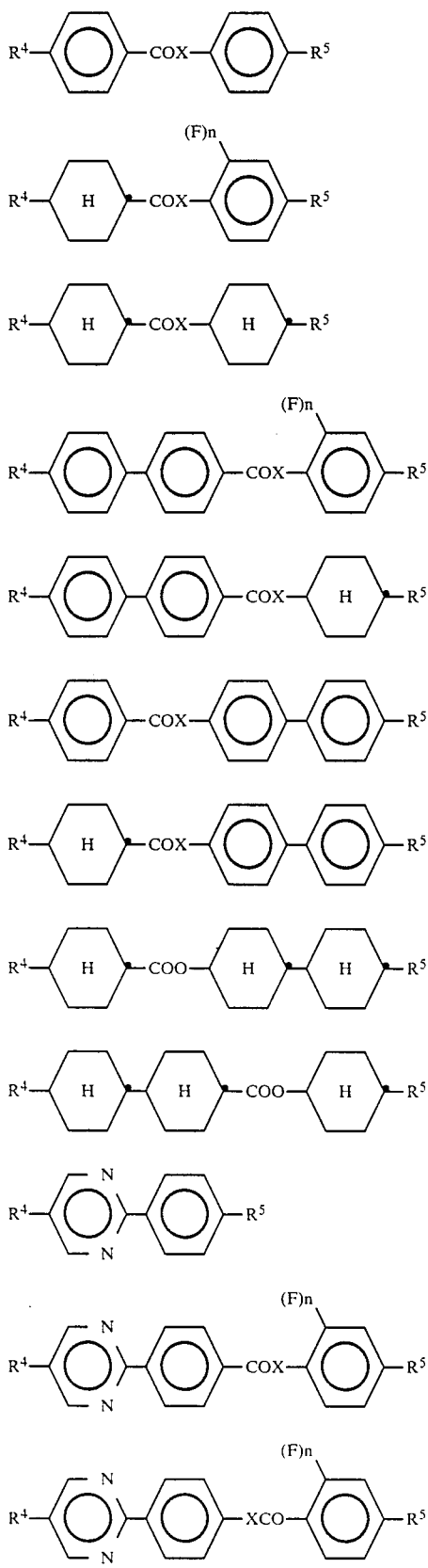

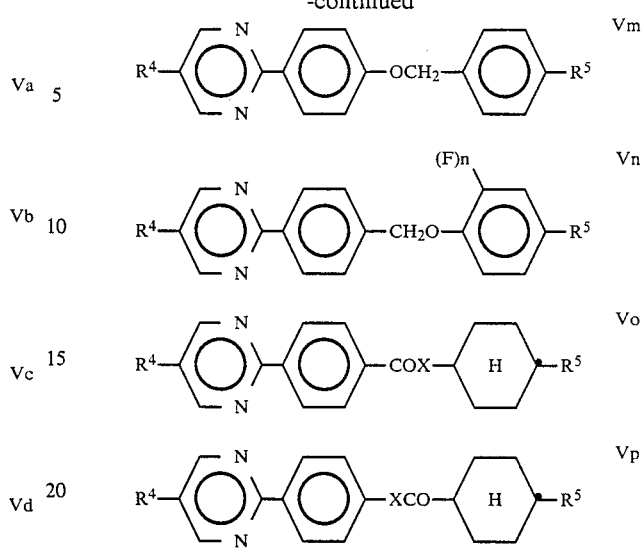

$R^4$ and $R^5$ are in each case preferably straight-chain alkyl, alkoxy, alkanoyloxy or alkoxycarbonyl in each case having 3 to 12 carbon atoms. X is preferably 0. n is 0 or 1.

Particularly preferred compounds are those of the subformulae Va, Vb, and Vf in which $R^4$ and $R^5$ are in each case straight-chain alkyl or alkoxy in each case having 5 to 10 carbon atoms.

The compounds of the subformulae Vc, Vh and Vi are suitable as additives for lowering the melting point and are normally added to the base mixtures in amounts of not more than 5%, preferably 1 to 3%. $R^4$ and $R^5$ in the compounds of the subformulae Vc, Vh and Vi are preferably straight-chain alkyl having 2 to 7, preferably 3 to 5, carbon atoms. A further class of compounds which is suitable for lowering the melting point in the phases according to the invention is that of the formula

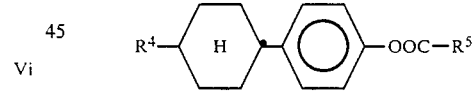

in which $R^4$ and $R^5$ have the preferred meaning given for Vc, Vh and Vi.

Suitable further components having negative dielectric anisotropy are furthermore compounds containing the structural element B or C.

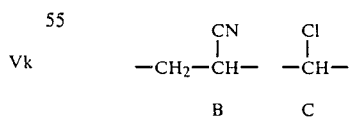

Preferred compounds of this type correspond to the formulae VIb and VIc:

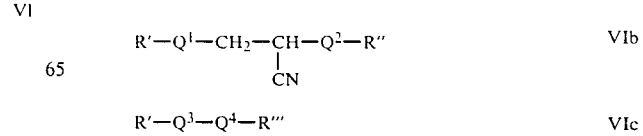

R' and R" are in each case preferably straight-chain alkyl or alkoxy groups in each case having 2 to 10 carbon atoms. $Q^1$ and $Q^2$ are in each case 1,4-phenylene, trans-1,4-cyclohexylene, 4,4'-biphenylyl, 4-(trans-4-cyclohexyl)-phenyl or trans,trans-4,4'-bicyclohexyl, or one of the $Q^1$ and $Q^2$ groups is alternatively a single bond.

$Q^3$ and $Q^4$ are in each case 1,4-phenylene, 4,4'-biphenylyl or trans-1,4-cyclohexylene. One of the $Q^3$ and $Q^4$ groups can alternatively be 1,4-phenylene, in which at least one CH group is replaced by N. R''' is an optically active radical having an asymmetrical carbon

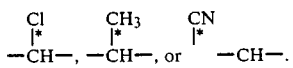

atom and having the structure —CH—, —CH— or —CH—. Particularly preferred compounds of the formula VIc are those of the formula VIc':

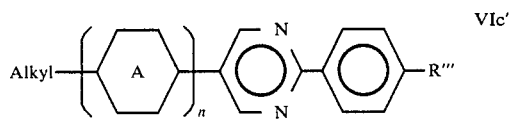

in which A is 1,4-phenylene or trans-1,4-cyclohexylene, and n is 0 or 1.

The phases according to the invention are produced in a fashion which is conventional per se. In general, the components are dissolved in one another, expediently at elevated temperature.

Through suitable additives, the liquid-crystalline phases can be modified according to the invention so that they can be used in all types of liquid-crystal display elements which have hitherto become known.

The following examples are intended to illustrate the invention without representing a limitation. Above and below, percentage data are percentages by weight; all temperatures are given in degrees Celsius. Furthermore: C denotes the crystalline solid state, S denotes the smectic phase (the index characterizes the phase type), N denotes the nematic state, Ch denotes the cholesteric phase and I denotes the isotropic phase. The number between two symbols gives the conversion temperature in degrees Celsius. "Conventional work-up" means that water is added, the mixture is extracted with methylene chloride, the organic phase is separated off, dried and evaporated, and the product is purified by crystallization and/or chromatography.

EXAMPLE 1

A liquid-crystalline phase comprising
7% of p-(5-heptylpyrimidin-2-yl)-phenyl p-pentylbenzyl ether,
9% of p-(5-heptylpyrimidin-2-yl)-phenyl p-hexylbenzyl ether,
3% of p-(5-nonylpyrimidin-2-yl)-phenyl p-pentylbenzyl ether,
5% of p-(5-nonylpyrimidin-2-yl)-phenyl p-heptylbenzyl ether,
25% of 2-p-nonyloxyphenyl-5-nonylpyrimidine,
30% of r-1-cyano-cis-4-(4'-octyloxybiphenyl-4-yl)-1-butylcyclohexane,
3% of optically active 2-octyl p-[5-nonylpyrimidin-2-yl)phenoxymethyl]-benzoate
12% of optically active r-4-(5-hexylpyrimidin-2-yl)phenyl 2-chloropropionate and
6% of p-[5-nonylpyrimidin-2-yl)-phenoxymethyl]-trifluorotoluene
exhibits C 15° Sc* 83° $S_A$* 87° CH 98° I, a spontaneous polarization of 12.4 nC/cm² and a tilt angle of 26°, in each case at 20° C.

EXAMPLE 2

A liquid-crystalline phase comprising
7% of p-(5-heptylpyrimidin-2-yl)-phenyl p-pentylbenzyl ether,
9% of p-(5-heptylpyrimidin-2-yl)-phenyl p-hexylbenzyl ether,
3% of p-(5-nonylpyrimidin-2-yl)-phenyl p-pentylbenzyl ether,
5% of p-(5-nonylpyrimidin-2-yl)-phenyl p-heptylbenzyl ether,
20% of 2-p-nonyloxyphenyl-5-nonylpyrimidine,
5% of 2-p-octyloxyphenyl-5-heptylpyrimidine,
15% of r-1-cyano-cis-4-(4'-octyloxybiphenyl-4-yl)-1-butylcyclohexane,
15% of r-1-cyano-cis-4-(4'-octylbiphenyl-4-yl)-1-pentylcyclohexane,
3% of optically active 2-octyl p-[5-nonylpyrimidin-2-yl)phenoxymethyl]-benzoate
12% of optically active r-4-(5-hexylpyrimidin-2-yl)-phenyl 2-chloropropionate and
6% of p-[5-nonylpyrimidin-2-yl)-phenoxymethyl]-trifluorotoluene
exhibits C 0° Sc* 72° $S_A$* 83° Ch 92° I and a spontaneous polarization of 10.5 nC/cm² at 20° C.

EXAMPLE 3

A liquid-crystalline phase comprising
7% of p-(5-heptylpyrimidin-2-yl)-phenyl p-pentylbenzyl ether,
9% of p-(5-heptylpyrimidin-2-yl)-phenyl p-hexylbenzyl ether,
3% of p-(5-nonylpyrimidin-2-yl)-phenyl p-pentylbenzyl ether,
5% of p-(5-nonylpyrimidin-2-yl)-phenyl p-heptylbenzyl ether,
20% of 2-p-nonyloxyphenyl-5-nonylpyrimidine,
5% of 2-p-octyloxyphenyl-5-heptylpyrimidine,
15% of r-1-cyano-cis-4-(4'-octyloxybiphenyl-4-yl)-1-butylcyclohexane,
15% of r-1-cyano-cis-4-(4'-heptylbiphenyl-4-yl)-1-hexylcyclohexane,
15% of optically active R-4-(5-hexylpyrimidin-2-yl)phenyl 2-chloropropionate and
6% of p-[5-nonylpyrimidin-2-yl)-phenoxymethyl]-trifluorotoluene
exhibits C 0° Sc* 73° $S_A$* 78° Ch 92° I, a spontaneous polarization of 12.3 nC/cm² and a tilt angle of 30°, in each case at 20° C.

EXAMPLE 4

0.03 m of 4-(4-propylphenyl)-benzoyl chloride is added dropwise with stirring to a solution of 0.03 m of p-(trifluoromethyl)-phenol in 50 ml of pyridine at 0°–5°, the mixture is stirred for a further 20 hours at room temperature, and worked up as conventional. p-Trifluoromethyl 4-(4-propylphenyl)-benzoate is obtained.

The following are prepared analogously:
p-trifluoromethyl p-(trans-4-propylcyclohexyl)-benzoate
p-trifluoromethyl p-(trans-4-butylcyclohexyl)-benzoate p-trifluoromethyl p-(trans-4-pentylcyclohexyl)-benzoate
p-trifluoromethyl p-(trans-4-hexylcyclohexyl)-benzoate
p-trifluoromethyl p-(trans-4-heptylcyclohexyl)-benzoate
p-trifluoromethyl p-(trans-4-nonylcyclohexyl)-benzoate
p-trifluoromethyl p-propylbenzoate
p-trifluoromethyl p-butylbenzoate
p-trifluoromethyl p-pentylbenzoate
p-trifluoromethyl p-hexylbenzoate
p-trifluoromethyl p-heptylbenzoate
p-trifluoromethyl p-nonylbenzoate

EXAMPLE 5

0.01 m of p-(trifluoromethyl)-benzoyl chloride is added dropwise with stirring to a solution of 0.01 m of 2-p-hydroxyphenyl-5-nonylpyrimidine in 20 ml of pyridine at 0°–5°, the mixture is stirred for 20 hours at room temperature, and worked up as usual. p-(5-Nonylpyrimidin-2-yl)-phenmyl p-(trifluoromethyl)-benzoate is obtained.

The following are prepared analogously:
p-(5-octylpyrimidin-2-yl)-phenyl p-(trifluoromethyl)-benzoate
p-(5-heptylpyrimidin-2-yl)-phenyl p-(trifluoromethyl)-benzoate
p-(5-hexylpyrimidin-2-yl)-phenyl p-(trifluoromethyl)-benzoate
p-(5-pentylpyrimidin-2-yl)-phenyl p-(trifluoromethyl)-benzoate

EXAMPLE 6

A mixture of 0.03 m of p-(trans-4-pentylcyclohexyl)-benzyl bromide (obtainable from p-(trans-4-pentylcyclohexyl)-benzoic acid), 0.03 m of p-(trifluoromethyl)-phenol, 0.03 m of potassium carbonate and 40 ml of DMF are warmed to 120° while stirring under the exclusion of air and, after cooling, worked up as usual. p-(Trifluoromethyl)-phenyl p-(trans-4-pentylcyclohexyl)-benzyl ether is obtained.

The following are prepared analogously:
p-(trifluoromethyl)-phenyl p-(trans-4-hexylcyclohexyl)-benzyl ether
p-(trifluoromethyl)-phenyl p-(trans-4-heptylcyclohexyl)-benzyl ether
p-(trifluoromethyl)-phenyl p-(trans-4-octylcyclohexyl)-benzyl ether
p-(trifluoromethyl)-phenyl p-(trans-4-nonylcyclohexyl)-benzyl ether

EXAMPLE 7

Analogously to Example 6, p-(5-nonylpyrimidin-2-yl)-phenyl p-(trifluoromethyl)-benzyl ether is obtained from p-(trifluoromethyl)-benzyl bromide (obtainable from p-(trifluoromethyl)-benzyl alcohol and HBr), 2-p-hydroxyphenyl-5-nonylpyrimidine, $K_2CO_3$ and DMF.

The following are prepared analogously:
p-(5-octylpyrimidin-2-yl)-phenyl p-(trifluoromethyl)-benzyl ether
p-(5-heptylpyrimidin-2-yl)-phenyl p-(trifluoromethyl)-benzyl ether
p-(5-hexylpyrimidin-2-yl)-phenyl p-(trifluoromethyl)-benzyl ether
(S)-p-[5-(6-methyloctyl)-pyrimidin-2-yl]-phenyl p-(trifluoromethyl)-benzyl ether
p-(5-octylpyridin-2-yl)-phenyl p-(trifluoromethyl)-benzyl ether
p-(5-heptylpyridin-2-yl)-phenyl p-(trifluoromethyl)-benzyl ether
p-(5-hexylpyridin-2-yl)-phenyl p-(trifluoromethyl)-benzyl ether
p-(5-pentylpyridin-2-yl)-phenyl p-(trifluoromethyl)-benzyl ether
p-(5-butylpyridin-2-yl)-phenyl p-(trifluoromethyl)-benzyl ether
p-(5-propylpyridin-2-yl)-phenyl p-(trifluoromethyl)-benzyl ether

EXAMPLE 8

In an autoclave, 0.1 m of p-[2-(p-pentylphenyl)ethyl]-benzoic acid (obtainable through hydrolysis of the corresponding benzonitrile) and 0.4 m of $SF_4$ are shaken for 7 hours at 130°. The reaction mixture is chromatographed over silica gel. p-[2-(p-Pentylphenyl)-ethyl]trifluoromethylbenzene is obtained.

The following are prepared analogously:
p-[2-(2-p-hexylphenyl)-ethyl]-trifluoromethylbenzene
p-[2-(p-heptylphenyl)-ethyl]-trifluoromethylbenzene
p-[2-(p-octylphenyl)-ethyl]-trifluoromethylbenzene
p-[2-(p-nonylphenyl)-ethyl]-trifluoromethylbenzene
p-(5-propylpyrimidin-2-yl)-trifluoromethylbenzene, m.p. 87°
p-(5-pentylpyrimidin-2-yl)-trifluoromethylbenzene, m.p. 50°
p-[p-(5-propylpyrimidin-2-yl)-phenyl]-trifluoromethylbenzene, m.p. 172°
p-(5-propylpyridin-2-yl)-trifluoromethylbenzene
p-(5-pentylpyridin-2-yl)-trifluoromethylbenzene
p-(5-heptylpyridin-2-yl)-trifluoromethylbenzene

EXAMPLE 9

A solution of 1.9 g of 1-[trans-4-(trans-4-propylcyclohexyl)-cyclohexyl]-2-(p-trifluorotolyl)-ethene (obtainable through Heck coupling of trans-4-(trans-4-propylcyclohexyl)-1-vinylcyclohexane with p-bromotrifluorotoluene) in 50 ml of tetrahydrofuran is hydrogenated at room temperature on 1 g of Pd/C (5%). After conventional work-up, 1-[trans-4-(trans-4-propylcyclohexyl)-cyclohexyl]-2-(p-trifluorotolyl)-ethane, m.p. 50°, c.p. 117°.

The following are prepared analogously:
1-[trans-4-(trans-4-ethylcyclohexyl)-cyclohexyl]-2-(p-trifluorotolyl)ethane
1-[trans-4-butylcyclohexyl)-cyclohexyl]-2-(p-trifluorotolyl)ethane
1-[trans-4-(trans-4-pentylcyclohexyl)-cyclohexyl]-2-(p-trifluorotolyl)ethane
1-[trans-4-(trans-4-hexylcyclohexyl)-cyclohexyl]-2-(p-trifluorotolyl)ethane
1-[trans-4-heptylcyclohexyl)-cyclohexyl]-2-(p-trifluorotolyl)ethane
1-(trans-4-ethylcyclohexyl)-2-(p-trifluorotolyl)-ethane
1-(trans-4-propylcyclohexyl)-2-(p-trifluorotolyl)-ethane
1-(trans-4-butylcyclohexyl)-2-(p-trifluorotolyl)-ethane
1-(trans-4-pentylcyclohexyl)-2-(p-trifluorotolyl)-ethane
1-(trans-4-hexylcyclohexyl)-2-(p-trifluorotolyl)-ethane
1-(trans-4-heptylcyclohexyl)-2-(p-trifluorotolyl)-ethane

EXAMPLE 10

A solution of 65 g of 4-n-pentylcyclohexanone in 200 ml of diethyl ether is added dropwise over the course of one hour with stirring and cooling to a Grignard solution prepared from 115 g of p-bromotrifluorotoluene and 13 g of magnesium turnings in 400 ml of diethyl ether. The reaction mixture is heated to boiling for a further hour and then poured into a solution of 50 ml of concentrated hydrochloric acid in 1 liter of ice water. The ether phase is separated off, and the aqueous phase is extracted by shaking twice with 100 ml of diethyl ether in each case. The combined ether phases are washed with 5% aqueous sodium hydrogen carbonate solution until neutral, dried over sodium sulfate and evaporated. The residue is subjected to separation over a column packed with silica gel. The 4-n-pentylcyclohexanol eluted using petroleum ether (boiling range 40°–60°) is dissolved in 1 liter of ethanol and hydrogenated for 72 hours at room temperature and atmospheric pressure in the presence of 75 g of moist Raney nickel. After the catalyst has been filtered off and the ethanol has been removed by distillation, the residue is worked up as usual and purified by chromatography. p(Trans-4-n-pentylcyclohexyl)-trifluorotoluene, m.p. 10°, c.p. −60°, is obtained.

The following are obtained analogously:
p-(-trans-4-ethylcyclohexyl)-trifluorotoluene
p-(-trans-4-propylcyclohexyl)-trifluorotoluene
p-(-trans-4-butylcyclohexyl)-trifluorotoluene
p-(-trans-4-hexylcyclohexyl)-trifluorotoluene
p-(-trans-4-heptylcyclohexyl)-trifluorotoluene
p-(trans-4-[2-(trans-4-ethylcyclohexyl)-ethyl]-cyclohexyl)-trifluorotoluene
p-(trans-4-[2-(trans-4-propylcyclohexyl)-ethyl]-cyclohexyl)-trifluorotoluene
p-(trans-4-[2-(trans-4-butylcyclohexyl)-ethyl]-cyclohexyl)-trifluorotoluene
p-(trans-4-[2-(trans-4-pentylcyclohexyl)-ethyl]-cyclohexyl)-trifluorotoluene
p-(trans-4-[2-(trans-4-hexylcyclohexyl)-ethyl]-cyclohexyl)-trifluorotoluene
p-(trans-4-[2-(trans-4-heptylcyclohexyl)-ethyl]-cyclohexyl)-trifluorotoluene

EXAMPLE 11

A solution of 29.3 g of trans-4-(trans-4-n-pentylcyclohexyl)-cyclohexanecarbonyl chloride in 120 ml of toluene is added dropwise in the course of 2 hours with stirring to a boiling solution of 16.2 g of p-trifluoromethylphenol and 10 ml of pyridine in 120 ml of toluene. The reaction mixture is refluxed for a further 3 hours and then evaporated. The residue is worked up as conventional. p-Trifluoromethylphenyl trans-4-(trans-4-n-pentylcyclohexyl)-cyclohexanecarboxylate is obtained.

The following are prepared analogously:
p-trifluoromethylphenyl trans-4-(trans-4-ethylcyclohexyl)-cyclohexanecarboxylate
p-trifluoromethylphenyl trans-4-(trans-4-propylcyclohexyl-cyclohexanecarboxylate
p-trifluoromethylphenyl trans-4-(trans-4-butylcyclohexyl)-cyclohexanecarboxylate
p-trifluoromethylphenyl trans-4-(trans-4-hexylcyclohexyl)-cyclohexanecarboxylate
p-trifluoromethylphenyl trans-4-(trans-4-heptylcyclohexyl)-cyclohexanecarboxylate
p-trifluoromethylphenyl trans-4-ethylcyclohexanecarboxylate
p-trifluoromethylphenyl trans-4-propylcyclohexanecarboxylate
p-trifluoromethylphenyl trans-4-butylcyclohexanecarboxylate
p-trifluoromethylphenyl trans-4-pentylcyclohexanecarboxylate
p-trifluoromethylphenyl trans-4-hexylcyclohexanecarboxylate
p-trifluoromethylphenyl trans-4-heptylcyclohexanecarboxylate

EXAMPLE 12

A nematic liquid-crystalline phase comprising
30% of trans-4-pentylcyclohexyl-trifluorotoluene
12% of trans-1-p-methoxyphenyl-4-propylcyclohexane
12% of trans-1-p-ethoxyphenyl-4-propylcyclohexane
10% of trans-1-p-butoxyphenyl-4-propylcyclohexane
10% of 4-ethyl-4'-(trans-4-propylcyclohexyl)-biphenyl
10% of 4-ethyl-4'-(trans-4-pentylcyclohexyl)-biphenyl
5% of 4,4'-bis-(trans-4-propylcyclohexyl)-biphenyl,
5% of 4,4'-bis-(trans-4-pentylcyclohexyl)-biphenyl and
6% of 4-(trans-4-pentylcyclohexyl)-4'-(trans-4-propylcyclohexyl)-biphenyl
exhibits a clear point of 70°, an optical anisotropy of 0.098 and a viscosity of 14 mPa.s at 20°.

EXAMPLE 13

A nematic liquid-crystalline phase is produced comprising
30% of 1[trans-4-propylcyclohexyl)-cyclohexyl]-2-(p-trifluorotolyl)-ethane
12% of trans-1-p-methoxyphenyl-4-propylcyclohexane
12% of trans-1-p-ethoxyphenol-4-propylcyclohexane
10% of trans-1-p-butoxyphenyl-4-propylcyclohexane
10% of 4-ethyl-4'-(trans-4-propylcyclohexyl)-biphenyl
10% of 4-ethyl-4'-(trans-4-pentylcyclohexyl)-biphenyl,
5% of 4,4'-bis-(trans-4-propylcyclohexyl)-biphenyl,
5% of 4,4'-bis-(trans-4-pentylcyclohexyl)-biphenyl and
6% of 4-(trans-4-pentylcyclohexyl)-4'-(trans-4-propylcyclohexyl)-biphenyl.

EXAMPLE 14

A nematic liquid-crystalline phase comprising
15% of trans-1-p-methoxyphenyl-4-propylcyclohexane
15% of trans-1-(trans-4-propylcyclohexyl)-4-methoxycyclohexane
10% of trans-1-(trans-4-propylcyclohexyl)-4-propoxycyclohexane
10% of trans-1-(trans-4-pentylcyclohexyl)-4-methoxycyclohexane
10% of trans-1-(trans-4-pentylcyclohexyl)-4-ethoxycyclohexane
10% of p-trifluoromethylphenyl trans-4-(trans-4-propylcyclohexyl)-cyclohexanecarboxylate
10% of p-trifluoromethylphenyl trans-4-(trans-4-butylcyclohexyl)-cyclohexanecarboxylate
10% of p-trifluoromethylphenyl trans-4-(trans-4-pentylcyclohexyl)-cyclohexanecarboxylate and
10% of p-trifluoromethylphenyl trans-4-(trans-4-heptylcyclohexyl)-cyclohexanecarboxylate
exhibits a clear point of 72°, an optical anisotropy of 0.086 and a viscosity of 18 mPa.s at 20°.

EXAMPLE 15

A nematic liquid-crystalline phase comprising
20% of p-trifluoromethylphenyl trans-4-phenylcyclohexanecarboxylate
10% of p-methoxyphenyl trans-4-propylcyclohexanecarboxylate
10% of p-ethoxyphenyl trans-4-propylcyclohexanecarboxylate
10% of p-methoxyphenyl trans-4-butylcyclohexanecarboxylate
10% of p-ethoxyphenyl trans-4-butylcyclohexanecarboxylate 10% of p-propylphenyl trans-4-(trans-4-propylcyclohexyl)-cyclohexanecarboxylate 10% of p-pentylphenyl trans 4-(trans-4-propylcyclohexyl)cyclohexanecarboxylate 10% of p-pentylphenyl trans-4-(trans-4-butylcyclohexyl)-cyclohexancarboxylate and 10% of p-propylphenyl trans-4-(trans-4-butylcyclohexyl-cyclohexanecarboxylate exhibits a clear point of 85°, an optical anisotropy of 0.094 and a viscosity of 14 mPa.s at 20°.

EXAMPLE 16

A ferroelectric liquid-crystalline phase comprising

7% of p-(5-heptylpyrimidin-2-yl)-phenyl p-pentylbenzyl ether

9% of p-(5-heptylpyrimidin-2-yl)-phenyl p-hexylbenzyl ether

3% of p-(5-nonylpyrimidin-2-yl)-phenyl p-pentylbenzyl ether

5% of p-(5-nonylpyrimidin-2-yl)-phenyl p-heptylbenzyl ether

28% of 2-p-nonyloxyphenyl-5-nonylpyrimidine,

30% of r-1-cyano-cis-4-(4'-octyloxybiphenyl-4-yl)-1-butylcyclohexane,

3% of optically active 2-octyl p-[5-nonylpyrimidin-2-yl)phenoxymethyl]-benzoate

12% of optically active R-4-(5-hexylpyrimidin-2-yl)phenyl 2-chloropropionate and 3% of p-(trans-4-n-pentylcyclohexyl)-trifluorotoluene exhibit a broad $S_A$ phase.

EXAMPLE 17

An equimolar mixture of p-trifluoromethylbenzaldehyde and 2-pentylpropane-1,3-diol in toluene is boiled on a water separator with catalysis by p-toluenesulfonic acid. When the water separation is complete and after conventional work-up, p-(trans-5-n-pentyl-1,3-dioxan-2-yl)trifluorotoluene, m.p. 44.3°, $\Delta\epsilon = +12.9$, is obtained.

The following are prepared analogously:

p-(trans-5-ethyl-1,3-dioxan-2-yl)-trifluorotoluene p-(trans-5-propyl-1,3-dioxan-2-yl)-trifluorotoluene, m.p. 57.0°, $\Delta\epsilon = +15.8$ p-(trans-5-butyl-1,3-dioxan-2-yl)-trifluorotoluene p-(trans-5-heptyl-1,3-dioxan-2-yl)-trifluorotoluene

EXAMPLE 18

A nematic liquid-crystalline phase is produced comprising

30% of p-(trans-5-n-pentyl-1,3-dioxan-2-yl)-trifluorotoluene,

12% of trans-1-p-methoxyphenyl-4-propylcyclohexane

12% of trans-1-p-ethoxyphenyl-4-propylcyclohexane

10% of trans-1-p-butoxyphenyl-4-propylcyclohexane

10% of 4-ethyl-4'-(trans-4-propylcyclohexyl)-biphenyl

10% of 4-ethyl-4'-(trans-4-pentylcyclohexyl)-biphenyl

5% of 4,4'-bis-(trans-4-propylcyclohexyl)-biphenyl

5% of 4,4'-bis-(trans-4-pentylcyclohexyl)-biphenyl and

6% of 4-(trans-4-pentylcyclohexyl)-4'-(trans-4-propylcyclohexyl)-biphenyl.

We claim:

1. A nematic liquid-crystalline phase comprising at least two components, wherein at least one component is a trifluorotoluene derivative selected from the following formulae:

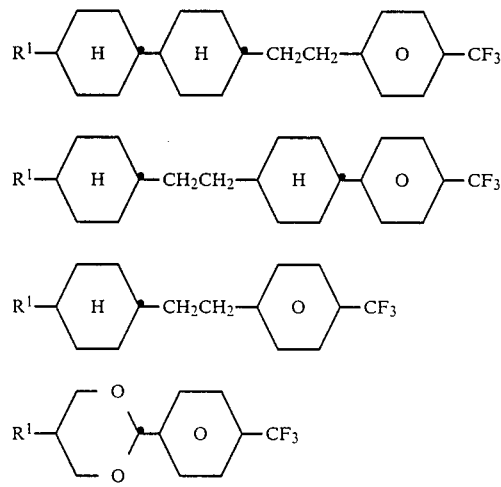

wherein $R^1$ is alkyl having 1 to 12 carbon atoms.

2. A liquid-crystalline phase according to claim 1, wherein $R^1$ is straight-chain alkyl having 2 to 7 carbon atoms.

3. A liquid-crystalline phase according to claim 1, wherein said at least one component is 1-(trans-4-(trans-4-propylcyclohexyl)-cyclohexyl)-2-(p-trifluorotolyl)-ethane.

4. In an electrooptical display element which contains a liquid-crystalline phase as a dielectric, the improvement wherein said phase is one of claim 1.

* * * * *